United States Patent
Zhu et al.

(10) Patent No.: US 9,507,462 B2
(45) Date of Patent: Nov. 29, 2016

(54) MULTI-DIMENSIONAL IMAGE DETECTION APPARATUS

(75) Inventors: Xiuling Zhu, Tai Po (HK); Wai Shan Lau, Kowloon (HK)

(73) Assignee: Hong Kong Applied Science and Technology Research Institute Company Limited, Hong Kong (CN)

( * ) Notice: Subject to any disclaimer, the term of this patent is extended or adjusted under 35 U.S.C. 154(b) by 4 days.

(21) Appl. No.: 13/495,449

(22) Filed: Jun. 13, 2012

(65) Prior Publication Data
US 2013/0335334 A1  Dec. 19, 2013

(51) Int. Cl.
  *G06F 3/041* (2006.01)
  *G06F 3/042* (2006.01)

(52) U.S. Cl.
  CPC ............ G06F 3/042 (2013.01); G06F 3/0428 (2013.01); *G06F 2203/04101* (2013.01)

(58) Field of Classification Search
  CPC .... G06F 3/0304; G06F 3/0421; G06F 3/042; G06F 2203/04101; G06F 2203/04108
  USPC .......................................................... 345/173
  See application file for complete search history.

(56) References Cited

U.S. PATENT DOCUMENTS

| | | | |
|---|---|---|---|
| 4,847,488 A * | 7/1989 | Muller | G01V 8/14 250/221 |
| 6,664,952 B2 * | 12/2003 | Iwamoto | G06F 3/0423 178/18.09 |
| 6,710,770 B2 * | 3/2004 | Tomasi et al. | 345/168 |
| 6,760,009 B2 * | 7/2004 | Omura | G06F 3/011 345/156 |
| 6,803,906 B1 * | 10/2004 | Morrison | G06F 3/0428 178/18.01 |
| 6,919,880 B2 * | 7/2005 | Morrison | G06F 3/0428 178/18.01 |
| 7,342,574 B1 * | 3/2008 | Fujioka | G06F 3/0428 178/18.01 |
| 7,375,720 B2 * | 5/2008 | Tanaka | G06F 3/0325 345/156 |
| 8,055,022 B2 * | 11/2011 | Morrison | G06F 3/0428 345/173 |
| 8,294,557 B1 * | 10/2012 | El Saddik | G06F 3/016 340/407.1 |
| 8,357,899 B2 * | 1/2013 | Liu | H04N 5/332 250/332 |
| 8,405,639 B1 * | 3/2013 | Fu | G06F 3/0423 178/18.09 |
| 8,593,417 B2 * | 11/2013 | Kawashima | B60K 35/00 345/156 |
| 8,593,434 B2 * | 11/2013 | Suggs | 345/175 |
| 8,786,576 B2 * | 7/2014 | Jung | G06F 3/0428 345/175 |

(Continued)

*Primary Examiner* — Temesghen Ghebretinsae
*Assistant Examiner* — Michael J Jansen, II
(74) *Attorney, Agent, or Firm* — Norton Rose Fulbright US LLP

(57) ABSTRACT

According to the present invention, a multi-dimensional image detection apparatus includes a touch surface, at least one two-vision image sensing module located proximally to the touch surface, and a control module coupled to the image sensing module. The multiple-dimensional image detection apparatus can detect a foreign object's image with at least two different dimensional modes. A method of multiple-dimensional image detection is also disclosed by reading the image data acquired by the image sensing module and comparing with a pre-stored background data to determine detecting the foreign object under a predetermined dimensional mode.

25 Claims, 17 Drawing Sheets

(56) References Cited

U.S. PATENT DOCUMENTS

| | | | |
|---|---|---|---|
| 8,797,297 B2* | 8/2014 | Yabuta | G06F 3/042 345/102 |
| 8,988,394 B2* | 3/2015 | Salsman | G06F 3/042 345/158 |
| 9,063,618 B2* | 6/2015 | Machii | G06F 3/0428 |
| 2001/0028344 A1* | 10/2001 | Iwamoto | G06F 3/0423 345/175 |
| 2003/0001825 A1* | 1/2003 | Omura | G06F 3/011 345/173 |
| 2004/0012573 A1* | 1/2004 | Morrison et al. | 345/173 |
| 2005/0041013 A1* | 2/2005 | Tanaka | G06F 3/0428 345/156 |
| 2005/0243070 A1* | 11/2005 | Ung | G06F 3/03545 345/176 |
| 2007/0012859 A1* | 1/2007 | Yabe | G02B 21/245 250/201.4 |
| 2007/0278406 A1* | 12/2007 | Haug | B60R 1/00 250/338.1 |
| 2008/0059915 A1* | 3/2008 | Boillot | 715/863 |
| 2008/0100572 A1* | 5/2008 | Boillot | 345/158 |
| 2008/0143682 A1* | 6/2008 | Shim | G06F 3/0428 345/173 |
| 2009/0009861 A1* | 1/2009 | Hyobu | G02B 5/0242 359/456 |
| 2009/0058832 A1* | 3/2009 | Newton | 345/175 |
| 2009/0245696 A1* | 10/2009 | Yuan | G06F 1/3203 382/312 |
| 2010/0104134 A1 | 4/2010 | Wang et al. | |
| 2010/0259492 A1* | 10/2010 | Chang | G06F 3/0428 345/173 |
| 2010/0295821 A1* | 11/2010 | Chang et al. | 345/175 |
| 2010/0315413 A1 | 12/2010 | Izadi et al. | |
| 2010/0321342 A1* | 12/2010 | Lee | G06F 3/0428 345/175 |
| 2011/0090147 A1* | 4/2011 | Gervais | G06F 3/017 345/157 |
| 2011/0134036 A1* | 6/2011 | Suggs | 345/158 |
| 2011/0141062 A1* | 6/2011 | Yu et al. | 345/175 |
| 2011/0148822 A1* | 6/2011 | Jung | G06F 3/0428 345/175 |
| 2011/0254864 A1* | 10/2011 | Tsuchikawa | G06F 3/0416 345/660 |
| 2011/0279397 A1* | 11/2011 | Rimon | G06F 3/044 345/173 |
| 2011/0304535 A1* | 12/2011 | Machii | G06F 3/0428 345/157 |
| 2011/0310048 A1* | 12/2011 | B.R et al. | G06F 3/04817 345/173 |
| 2012/0025080 A1* | 2/2012 | Liu | H04N 5/332 250/332 |
| 2012/0050180 A1* | 3/2012 | King | G06F 3/0416 345/173 |
| 2012/0092284 A1* | 4/2012 | Rofougaran | G06F 3/017 345/173 |
| 2012/0092301 A1* | 4/2012 | Park | G06F 3/0428 345/175 |
| 2012/0139855 A1* | 6/2012 | Suh | G06F 3/042 345/173 |
| 2012/0229377 A1* | 9/2012 | Kim | G06F 3/017 345/157 |
| 2012/0242660 A1* | 9/2012 | Kim | G06T 19/20 345/419 |
| 2012/0249429 A1* | 10/2012 | Anderson | G06F 3/011 345/173 |
| 2012/0249484 A1* | 10/2012 | Hata et al. | 345/175 |
| 2012/0262398 A1* | 10/2012 | Kim | G06F 3/041 345/173 |
| 2012/0326995 A1* | 12/2012 | Zhang et al. | 345/173 |
| 2013/0027354 A1* | 1/2013 | Yabuta | G06F 3/042 345/175 |
| 2013/0050131 A1* | 2/2013 | Lee | G08G 1/09626 345/174 |
| 2013/0100020 A1* | 4/2013 | Salsman | G06F 3/042 345/158 |
| 2013/0100082 A1* | 4/2013 | Bakin | G06F 3/042 345/175 |
| 2013/0106782 A1* | 5/2013 | Nowatzyk | G06F 3/03545 345/175 |
| 2013/0127705 A1* | 5/2013 | Jung | G06F 3/0304 345/156 |
| 2013/0135255 A1* | 5/2013 | Gally | G02B 26/001 345/175 |
| 2013/0335334 A1* | 12/2013 | Zhu | G06F 3/042 345/173 |
| 2013/0342491 A1* | 12/2013 | Liu | G06F 3/041 345/173 |
| 2014/0022198 A1* | 1/2014 | Tanaka | G06F 3/0418 345/173 |

* cited by examiner

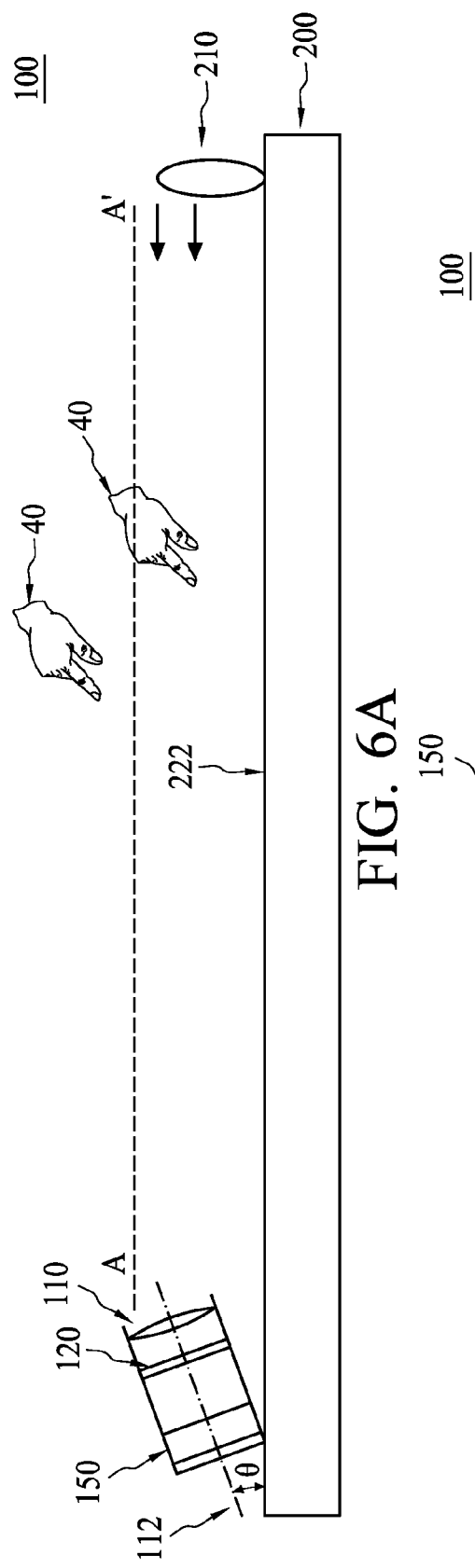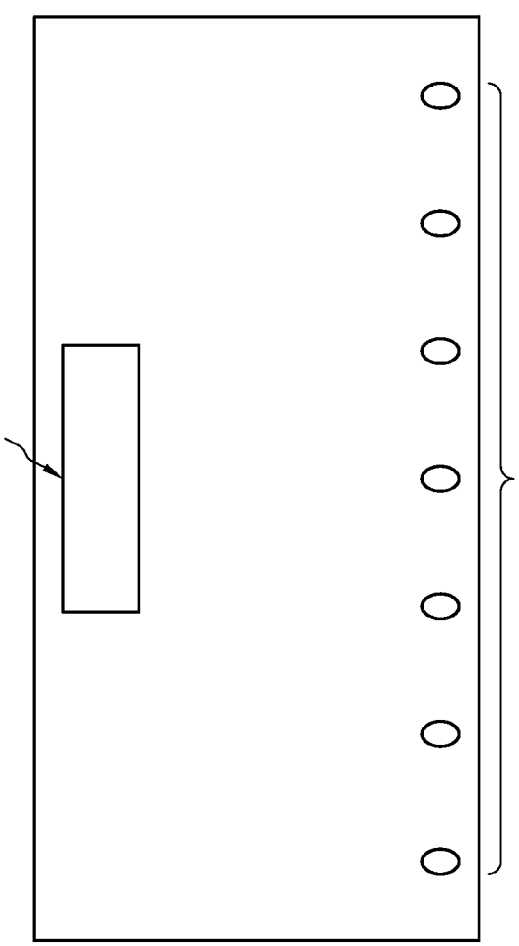
FIG. 6A
FIG. 6B

MULTI-DIMENSIONAL IMAGE DETECTION APPARATUS

FIELD OF THE INVENTION

The present invention relates to a multi-dimensional image detection apparatus thereof, which is used to conduct multi-dimensional image detection, or gesture recognition.

BACKGROUND

Image detection has become a popular function in recent years because it can be used to easily detect an object from a remote site immediately and without undue effort. Applications such as those for surveillance systems could become one of the first fields to make extensive use of image detection in order to detect 3D images in the detectable range. Video gaming is another field that has recently begun adopting the 3D detection technology. Such 3D detection technology provides an extraordinary experience to users, who can experience mutual interaction.

The 2D (two dimensional) image detection technology also plays an important role in modern consumer electronics, especially flat panel devices. Several different approaches have been implemented to detect a foreign object's two dimensional images. Touch control is commonly applied by sensing the variation of capacitance or other physical properties underneath the touch panel. Another way to realize a 2D touch function is usually operated with the aid of an image sensor or camera to capture the image data of the moving object. Moreover, more and more designers hope to improve the feasibility of image detection by integrating 2D and 3D functions into a dual-mode detection device. However, constructing such a device within limited space and with a minimum of components presents a significant challenge.

SUMMARY OF THE INVENTION

The present invention is created in view of the problems described above. One objective of the present invention is to provide a technique capable of capturing an image under either a 2D or a 3D mode utilizing at least one image sensing module.

According to the present invention, the image of an object within the detectable range is acquired and digitized by a multi-dimensional image detection apparatus. The apparatus has at least one image sensing module and a control module which is coupled with the image sensing module. The image sensing module is designed to be capable of performing two-vision image acquisition. The apparatus can further include a touch surface which can be disposed proximally to the image sensing module.

According to the present invention, a method of acquiring an image under multi-dimensional mode is realized by acquiring the image of a foreign object with at least one image sensing module. Further comparing the image pixel data acquired with the pre-stored background data, the apparatus can identify the location of the foreign object and determine the mode of operation. The apparatus can further recognize the gesture or dynamic movement of the detected object by utilizing triangulation to determine the coordinates of the object in real time.

BRIEF DESCRIPTION OF THE DRAWINGS

The present invention will be appreciated and understood more fully from the following detailed description, taken in conjunction with the drawings in which:

FIGS. 6A and 6B are simplified pictorial illustrations of a multi-dimensional image detection apparatus accompanied by a plurality of light emitting sources in accordance with an embodiment of the present invention.

DETAILED DESCRIPTION OF THE INVENTION

The embodiments of the present invention are described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. As used herein, the term "or" is an inclusive "or" operator, and is equivalent to the term "and/or," unless the context clearly dictates otherwise. In addition, throughout the specification, the meaning of "a," "an," and "the" include plural references. The term "coupled" implies that the elements may be directly connected together or may be coupled through one or more intervening elements.

Figure 1:
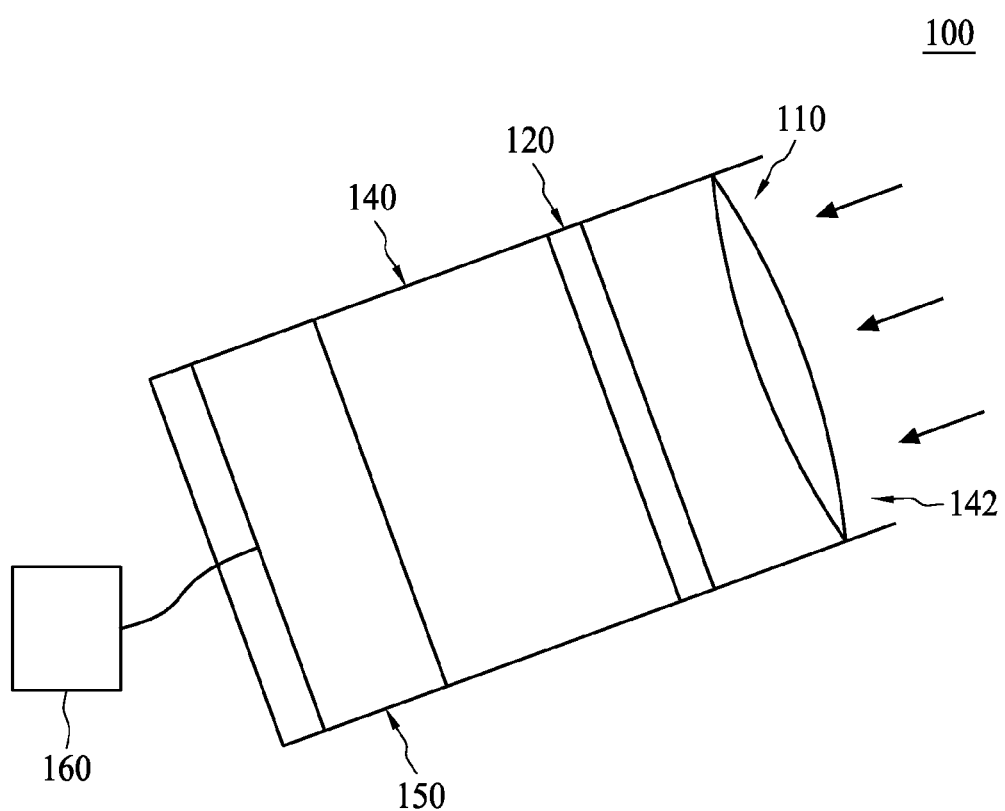
FIG. 1 is an illustration of a multi-dimensional image detection module configured to receive object images in accordance with an embodiment of the present invention.

Reference is first made to FIG. 1, which is a pictorial diagram of a multi-dimensional image detection module 100 that is designed to acquire an image under multifold modes in accordance with an embodiment of the present disclosure. The detection module 100 includes an image sensing module 150 and a control module 160 which is coupled with the image sensing module 150. The image sensing module 150 is able to perform two-vision operation. The term "two-vision operation" used herein means that the image sensing module can acquire an image under at least two different modes. In the present embodiment, the image acquiring process can be realized by the sensing module 150 under two dimensional (2D) and/or three dimensional (3D) mode. The control module 160 is configured to coordinate the two-vision operation of the image sensing module 150. Moreover, the control module can also process the image data captured by the sensing module 150. The embodiment can further optionally include a light focusing device 110 and a light screen 120. The light focusing device 110 is mainly used to converge light on its virtual focal plane. The focusing device 110 can be an optical device with perfect or approximate axial symmetry which transmits and refracts light. The device 110 can be a simple lens consisting of a single optical element, or a compound lens with an array of simple lenses with a common axis. The light screen 120 acts like a filter to allow only a predetermined light spectrum to pass through it and blocks others; the selection can be customized in accordance with the requirement of the detection module 100. Additionally, either a partial or full light screen can be chosen. A partial light screen means at least a portion of the light screen 120 is constructed to permit only a predetermined light spectrum to pass through it. In an embodiment of the present disclosure, the predetermined light spectrum includes light within the infrared spectrum wavelength (abbreviated as IR hereinafter). The light screen 120 can optionally work corresponding to the focusing device 110. They can be physically integrated into one part to work in accordance or separated. The light screen 120 can be placed in front of the focusing device 110 during operation, or vice versa. The focusing device 110 and the light screen 120 can be optionally surrounded with the inner wall of a case 140 and be affixed closely to its inlet 142, such that the whole assembly allows the focusing device 110, the light screen 120, and the image sensing module 150 to only receive light entering the inlet 142 without other light interference. In the present embodiment, the focusing device 110 is located closer to the inlet 142 than the light screen 120 but there is no limitation of the arrangement according to the present disclosure (i.e. the light screen 120 can be arranged closer than the focusing device 110 to the inlet). The control module 160 can be disposed within the case 140 or external to the case 140 according to designer's preference. In another embodiment, the imaging sensing module 150 is preferably disposed on the focal plane of the focusing device 110 and configured to detect the light passing through the light screen 120.

In the embodiment shown in FIG. 1, the light screen 120 is designed to allow only IR to pass through, so that the image sensing module 150 receives only IR entering the inlet 142. Through the image sensing module 150, the control module 160 realizes the appearing object's IR image passing through the light screen 120. Comparing the object's image data acquired by the image sensing module 150 with a pre-stored background data (like an initial value), the control module 160 instructs the image sensing module 150 to operate under a specified dimensional mode according to the appearing object's location relative to a reference point. The reference point can be the apparatus 100 or a relatively steady (compared to the appearing object) point.

Figure 2A:
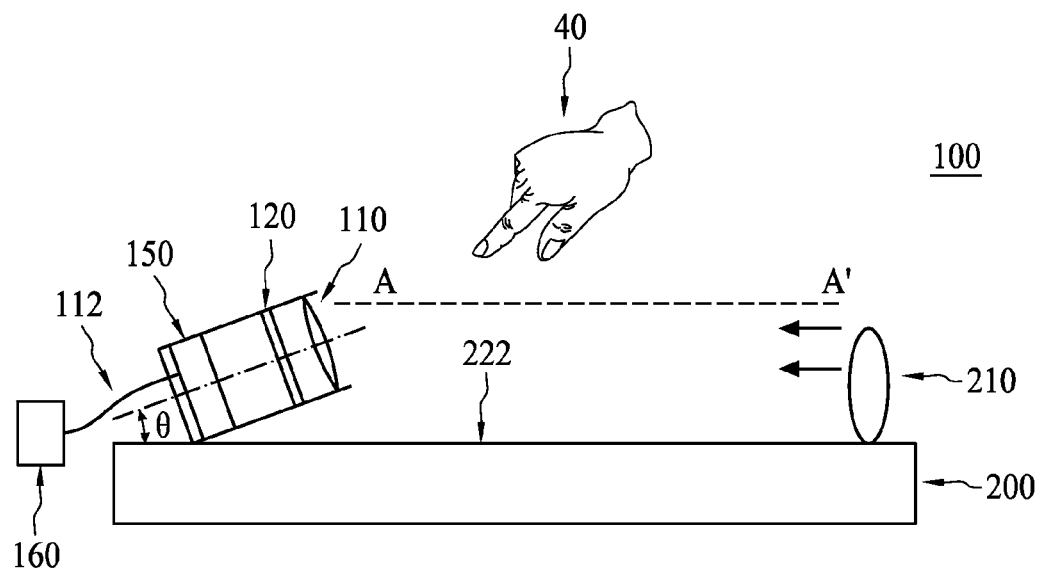
FIGS. 2A and 2B are simplified pictorial illustrations of a multi-dimensional image detection apparatus accompanied by a light emitting source employing multifold dimensional detecting in accordance with an embodiment of the present invention.
Figure 2B:
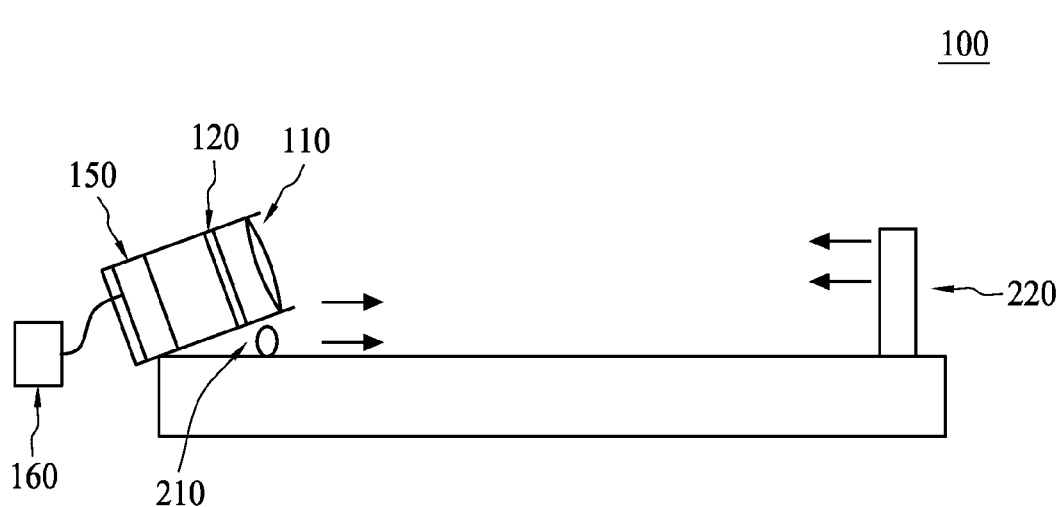
Figure 3:
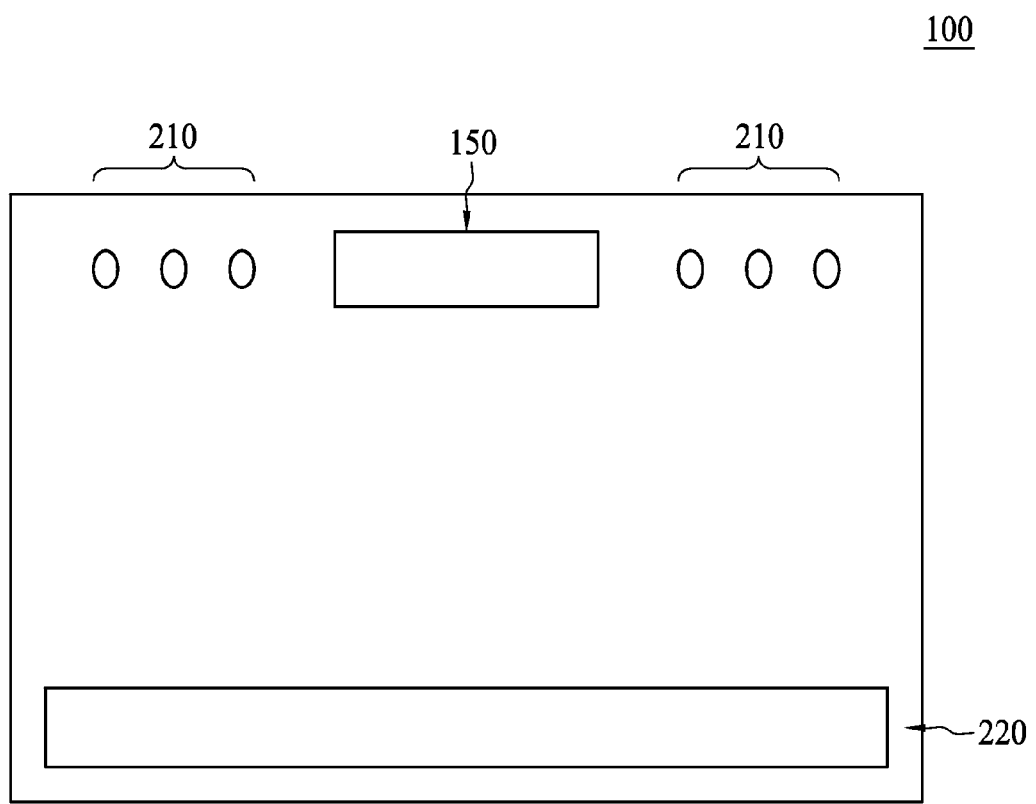
FIG. 3 is an illustration of a multi-dimensional image detection apparatus configured to receive object images in accordance with an embodiment of the present invention.

FIGS. 2A and 2B illustrate how to determine the operation mode of a multi-dimensional image detection apparatus 100 by utilizing the embodiment as illustrated in FIG. 1. The apparatus 100 can be optionally disposed on a substrate 200. The substrate 200 has a touch surface 222 which can detect the object by touching and the image sensing module is disposed on the touch surface 222. The apparatus 100 further includes a light source 210 which can emit a predetermined light spectrum corresponding to the light screen 120 (e.g, the IR can be permitted to pass the screen). In the present embodiment, the light spectrum emitted by the light source 210 is IR. The light source 210 is preferably disposed at a location which allows the emitted light to be received by the detector; as shown in the present embodiment, the light source 210 is disposed on the edge distal to the image sensing module 150. In another embodiment as shown in FIG. 2B, when there is a retroreflector 220 added and disposed at the edge distal to image sensing module 150, the light source 210 can be arranged at the edge proximal to the image sensing module 150. Light emitted from the source 210 is reflected back to the image sensing module 150 by the retroreflector 220. The apparatus 100 may acquire a background data during the initial stage and the background data is pre-stored. When a foreign object, such as a finger, appears in a detectable range of the apparatus 100, the image sensing module 150 firstly acquires the image data of pixels in region under line AA'. The line AA' can be aligned with the top of the detection module 101, or the source 210 or the retroreflector 220, which is about several millimeter to tens of millimeter about the touch surface 222. The control module 160 compares the signal data of pixels acquired with the pre-stored background data. If the control module 160 realizes that the foreign object is substantially touching the surface 222, it commands the image sensing module 150 to acquire the object under a first multi-dimensional mode (or the first vision), which in this example is two dimensional (2D) or planar mode. On the other hand, if the control module 160 recognizes that the foreign object does not touch the surface 222, the control module 160 then commands or instructs the image sensing module 150 to acquire the image data from region above line AA' and operate under a second multi-dimensional mode, for example, three dimensional or stereoscopic mode. Therefore, the apparatus 100 can automatically switch its detection mode (for example, between 3D and 2D) during the image acquisition process. The angle θ between the axial line 112 of the focusing device 110 and the substrate's first surface 222 can be changed in order to adjust the sensitivity of the motion detector 100. In one embodiment, the angle θ is 40 to 60 degrees and in another embodiment, the angle is 40 to 50 degrees. In another embodiment, the angle is set to be from 42 to 48 degrees. In an embodiment, the angle is around 45 degrees. Quantities of the light source 210 can be changed according to requirement, in one embodiment, in order to enhance the intensity of the image data, a plurality of light sources 210 are arranged in the apparatus 100 as shown in FIG. 3.

Figure 4A:
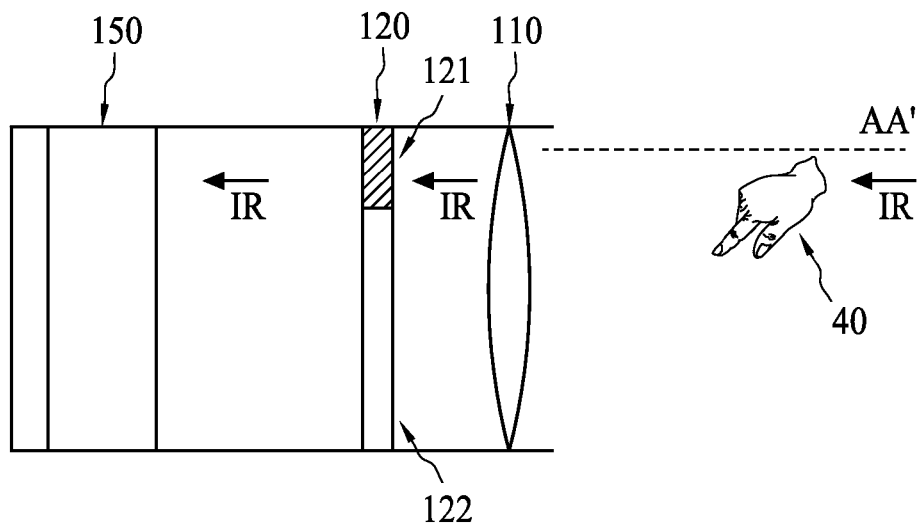
FIGS. 4A and 4B are simplified pictorial illustrations of a multi-dimensional image detection apparatus employing multifold dimensional detecting in accordance with an embodiment of the present invention.

FIG. 4A illustrates another embodiment according to the present disclosure. A multi-dimensional image detection apparatus 100 includes a light focusing device 110, a light screen 120, and an image sensing module 150. A portion of the light screen 120 is constructed to permit only a predetermined light spectrum to pass through the screen (called PS section 121 hereinafter) and the rest of the light screen 120 is a visible light passing section (called VS section 122 hereinafter). In the present embodiment, the predetermined light spectrum is IR. When a foreign object 40 appears in a region under line AA' (low region), the image sensing module 150 can acquire IR signal data of pixels in the low region. When the object 40 leaves the low region as shown in FIG. 4B and enters into the region above line AA' (high region), the image sensing module 150 acquires the visible light image passing through the VS section 122.

Figure 4B:
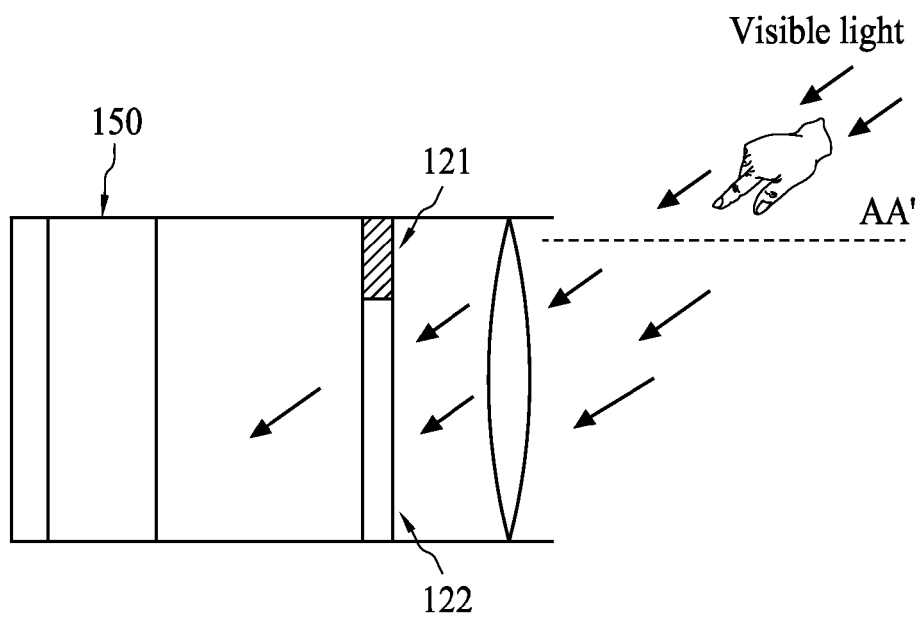
Figure 5:
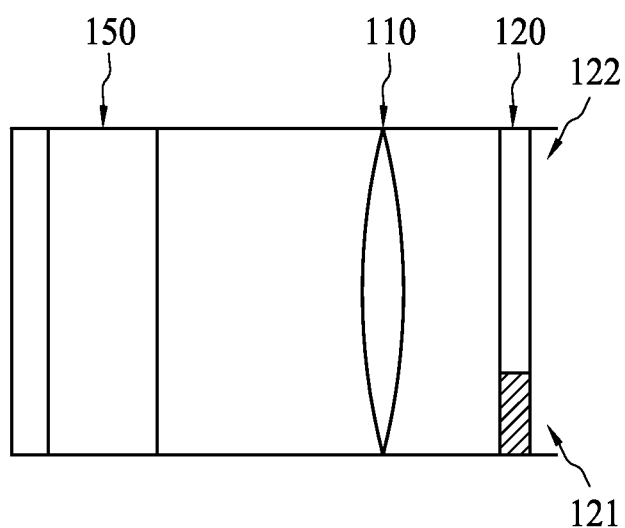
FIG. 5 illustrates another embodiment which is substantially similar to FIGS. 4A and 4B.

FIG. 5 illustrates another embodiment which is substantially similar to FIGS. 4A and 4B. The light screen 120 is disposed in front of the focusing device 110 and the arrangement of the PS section on the light screen 120 is reversed.

The two-sectioned light screen 120 used in the present disclosure should not be interpreted as the limitation of the light screen 120. People who have ordinary skill in the related field should appreciate that both single-sectioned and multi-sectioned designs are within the scope of the present disclosure. In one embodiment, a two-sectioned light screen 120 has a larger VS section 122. In another embodiment, the area ratio of the VS section to the PS section 121 is between 6 and 12. In another embodiment, the area ratio of the VS section to the PS section is between 8 and 11. In another embodiment, the area ratio of the VS section to the PS section is around 10.

FIGS. 6A and 6B depict an embodiment according to the present disclosure. A multi-dimensional image detection apparatus 100 similar to the apparatus 100 as described in FIG. 4A further includes a substrate 200 and a light source 210 emitting a specified light spectrum (use IR as an example hereinafter) which is allowed to pass through the PS section of a light screen 120. The apparatus 100 may conduct an initialization step by acquiring the image data pixels without any object appearing in the detection region (one meter or more away from the apparatus 100) via the image sensing module 150 in order to generate background data which may be pre-stored in the apparatus 100 or other storage device coupled to the apparatus 100. After initialization step, the apparatus 100 can start operating the multifold-mode detection. With the light source 210 turned on, the apparatus 100 acquires the image of the foreign object 40 appearing within the detection range and analyzes the pixels of the IR image data acquired from the region under line AA' (called the low region hereinafter). If the apparatus 100 compares the image data with the pre-stored background data and identifies that the object 40 appears in the low region and substantially touching the surface 222, the apparatus 100 operates under a first multi-dimensional mode, in this embodiment, two dimensional or planar mode. Otherwise, the apparatus 100 operates under a second multi-dimensional mode, in this embodiment, the three dimensional or stereoscopic mode, and the detector 100 starts capturing the image data from the region above line AA' (called the high region hereinafter). The angle θ between the axial line 112 of the focusing device 110 and substrate 200's first surface 222 may affect the detectable range of different multi-dimensional modes. In this embodiment, if θ is smaller, the detector 100 has smaller detectable range in three dimensional mode. The angle may vary from 40 to 60 degrees according to the vertical view angle of the image sensing module 150, θ is better to be set as the half degree of the vertical view angle. In an embodiment, the angle is 40 to 50 degrees. In another embodiment, the angle is set to be from 42 to 48 degrees. In another embodiment, the angle is around 45 degrees.

FIG. 6B is the top view of the embodiment illustrated in FIG. 6A. The light source 210 is located proximal to the edge which is opposite to the edge where the apparatus 100 is disposed.

Figure 7A:
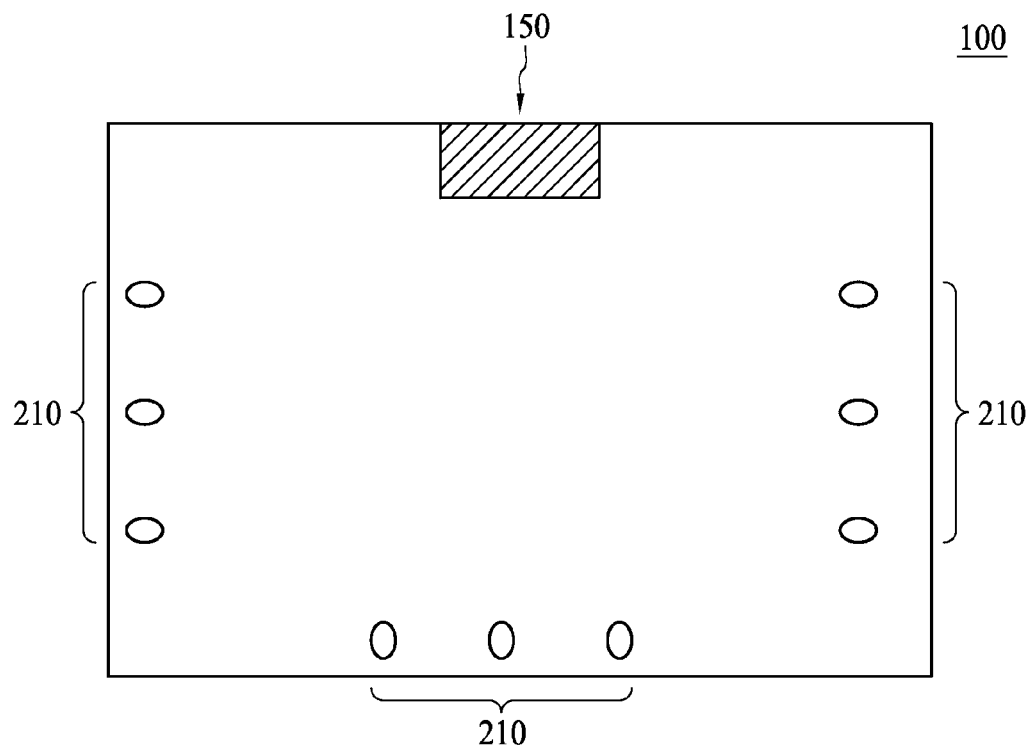
FIGS. 7A and 7B are simplified pictorial illustrations of a multi-dimensional image detection apparatus accompanied by a plurality of light emitting sources in accordance with an embodiment of the present invention
Figure 7B:
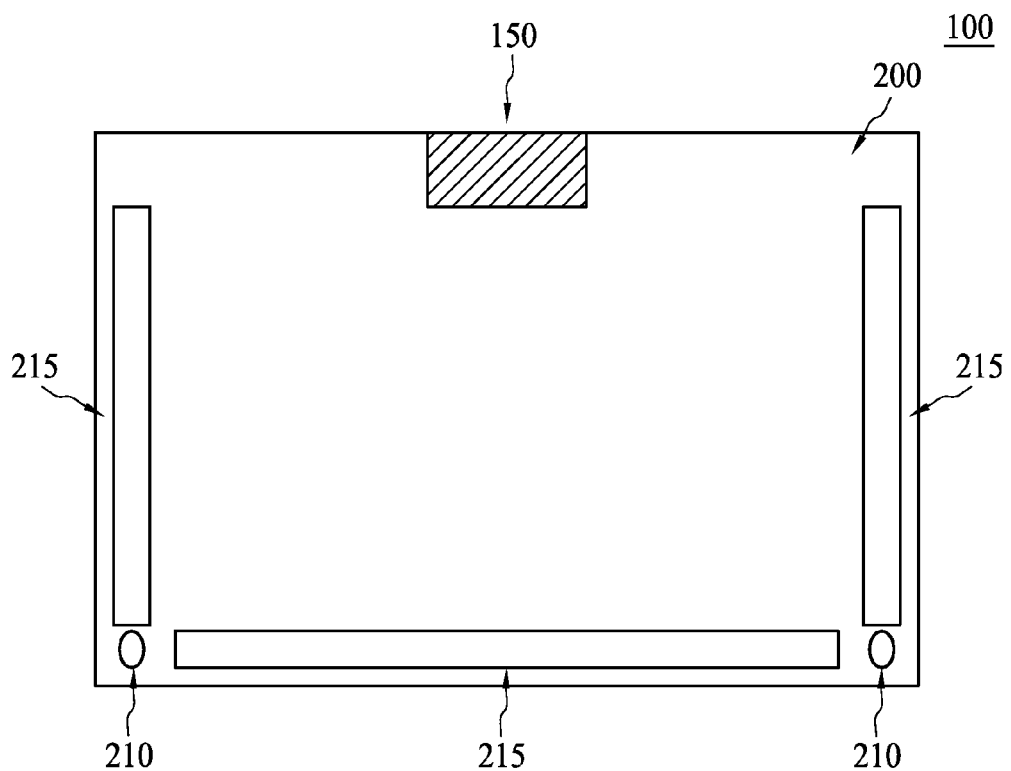

FIG. 7A illustrates another embodiment which is similar to FIG. 6B; however, the apparatus 100 includes several light sources 210 which are arranged on more than one side of the substrate 200. FIG. 7B illustrates another embodiment which incorporates at least one light guide 215 disposed on at least one side of the substrate 200. Furthermore, at least one light source 210 is disposed close to the light guide 215. Via the light guide, the light emitted from the light source 210 is distributed on the detection range of the apparatus 100.

Figure 8A:
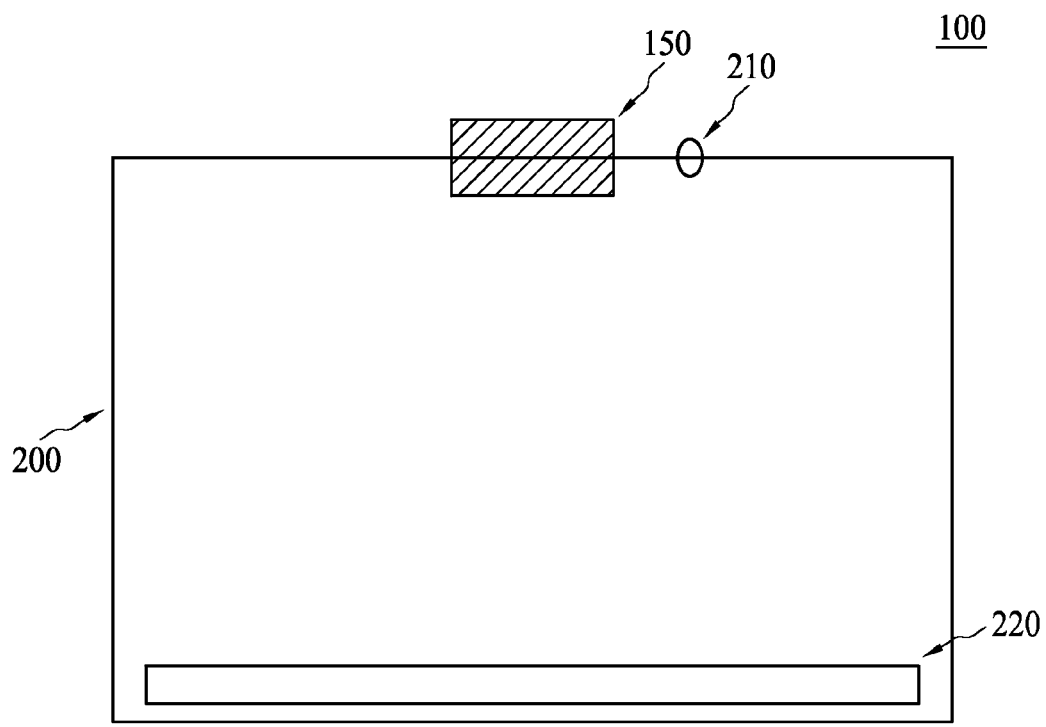
FIGS. 8A and 8B are simplified pictorial illustrations of a multi-dimensional image detection apparatus employing a retroreflector in accordance with an embodiment of the present invention.
Figure 8B:

A retroreflector 220 can be introduced into the apparatus 100 as illustrated in FIGS. 8A and 8B. The light source 210 is disposed proximally to the apparatus 100 on the side which is opposite to the retroreflector 220 on substrate 200. When a predetermined light spectrum is emitted from the light source 210, the light travels across the substrate until it is bounced back by the retroreflector 220, such that the image sensing module 150 receives the reflected light. The height "h" of the retroreflector 220 can be changed to affect the sensitivity of the apparatus 100's mode switching. If h increases, the apparatus 100 becomes more sensitive to switch between different modes and may be disturbed more frequently by false signals. However, if h decreases, the light reflected by the retroreflector 220 becomes less significant and the apparatus 100 may not receive enough signals from the light source 210 in order to accurately determine the detection mode. In an embodiment, the height h is set between 2 and 10 mm. In another embodiment, the height h is between 5 and 7 mm.

In addition to having only one image sensing module, the aforementioned embodiments can be further expanded to include two sensing modules that are disposed on different position respectively.

Figure 9:
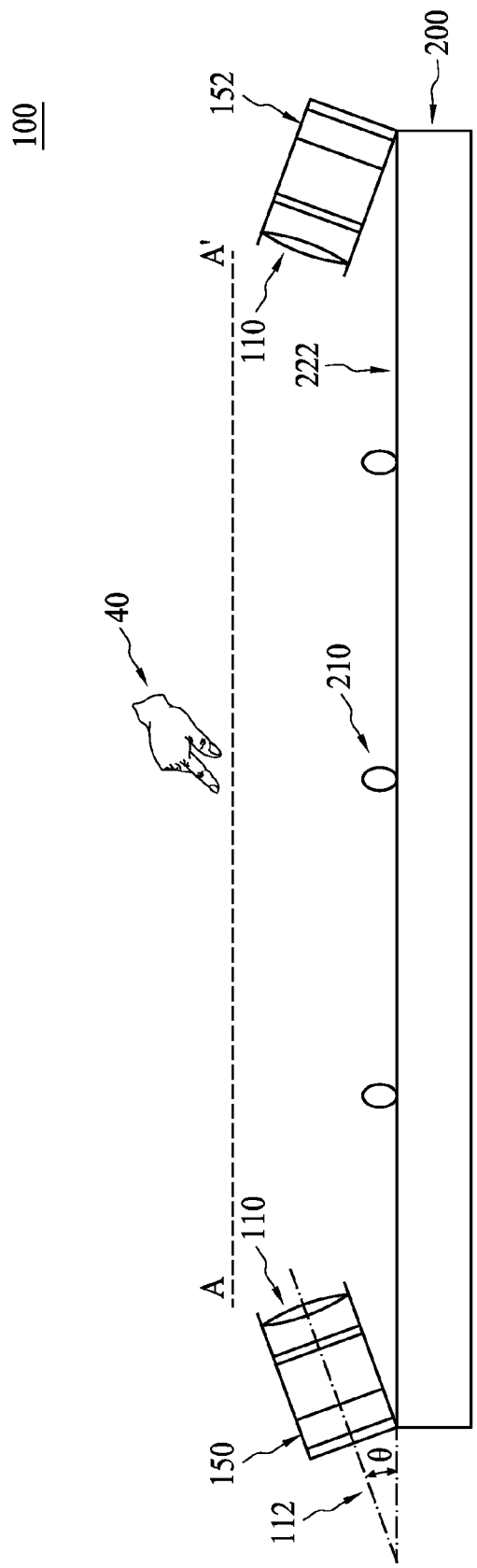
FIG. 9 is a simplified pictorial illustration of a multi-dimensional image detection apparatus in accordance with an embodiment of the present invention.

FIG. 9 illustrates an embodiment including a first image sensing module 151 and a second image sensing module 152. The apparatus 100 further has a substrate 200, light emitting sources 210 and optionally a retroreflector 220. The first sensing module 151 and the second sensing module 152 are respectively disposed at different locations. In the present embodiment, they are disposed at different corners on the substrate 200. The first sensing module 151 and the second sensing module 152 each can independently acquire the image of the foreign object 40. When one of the sensing modules, for example the first sensing module 151 captures the signal data of pixels in the low region, it further compared the acquired data with a pre-stored background data which may be generated during initialization step. If the first sensing module 151 identifies the foreign object is substantially touching the contact surface 222, then the second image sensing module 152 reads the signal data in the low region and the apparatus 100 operates under the two-dimensional or planar mode. The two dimensional coordinate of the object 40 in the low region can be further derived from triangulation conducted by the apparatus 100. Alternatively, if the first sensing module 151 analyzes the signal data of image pixels in low region and identifies that the object 40 is not touching the surface 222, the first image sensing module 151, along with the second image sensing module 152, read the object 40's image pixels in the high region which is above line AA'. The apparatus 100 operates under a second multi-dimensional mode, in this embodiment, the three-dimensional or stereoscopic mode. Thereafter, the three dimensional coordinate of the object 40 in the high region can be derived from triangulation conducted by the apparatus 100. Under the three-dimensional mode, the detectable range of a foreign object 40 can be adjusted by the setting angle θ which is between the axial line 112 of the focusing device 110 and substrate 200's first surface 222. In one embodiment, the angle θ is 40 to 60 degrees and in another embodiment, the angle is 40 to 50 degrees. In another embodiment, the angle is set to be from 42 to 48 degrees. In an embodiment, the angle is around 45 degrees. In one embodiment, the highest point that can be detected by the apparatus under the three-dimensional mode is about 1 meter above the substrate 200's touch surface 222.

In addition to the position or coordinates of the detected object 40, the image sensors 151 and 152 can also dynamically recognize the motion of the object 40 within the detectable range. When the object 40 moves within the detectable range, the apparatus 100 can operate either under the two-dimensional mode or the three-dimensional mode based on whether the object 40 touching the contact surface 222 or not. The apparatus 100 can continuously identify coordinate changes of the object from analyzing the data of image pixels. Each position where the object 40 has travelled is recognized by the apparatus 100, so the direction and moving distance are readily available by the calculation done by the control module.

Figure 10:
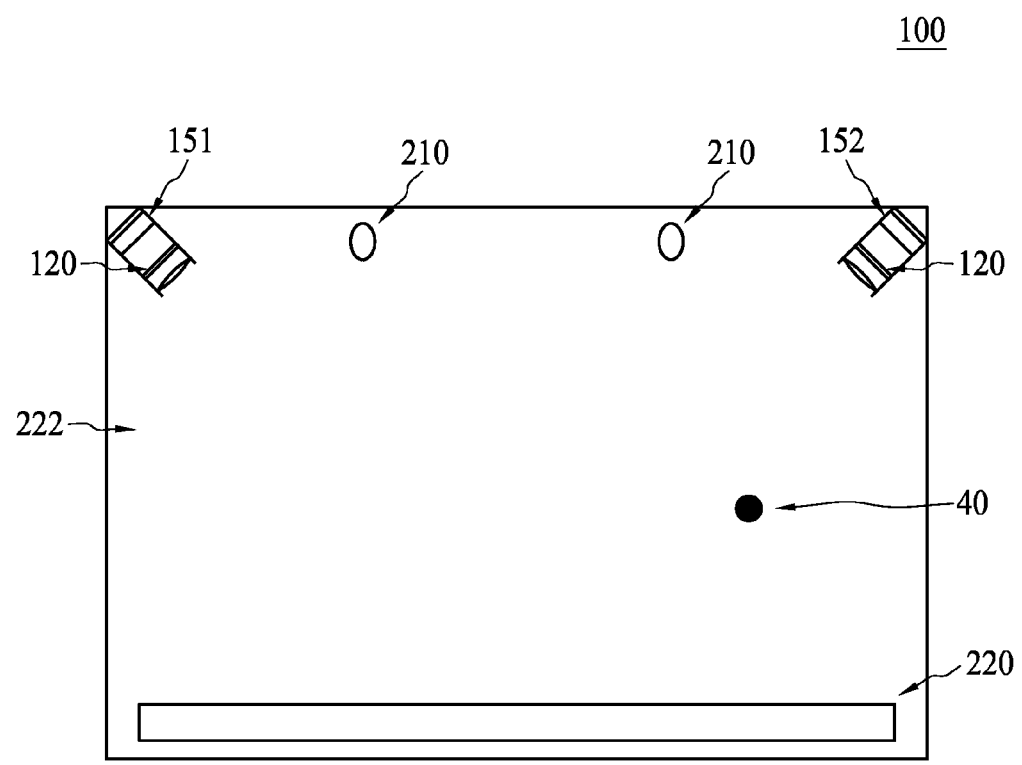
FIG. 10 is a simplified pictorial illustration of a multi-dimensional image detection apparatus including a plurality of light emitting sources and a retroreflector in accordance with an embodiment of the present invention.

FIG. 10 illustrates the top view of a multi-dimensional image detection apparatus 100 which includes a first image sensing module 151 and a second sensing module 152. The light screen 120 corresponding to each sensing module is substantially similar to the one adopted by the embodiment illustrated in FIG. 2A. The light screen 120 only permits a predetermined light spectrum other than visible light to pass the screen. The apparatus 100 further includes at least one light source 210 on substrate 200's touch surface 222 and a retroreflector 220 disposed on one side which is opposite to the light source. The quantity of light sources to be used is dependant on the stability or reliability required by the user. In general, more light sources disposed on the surface may improve the image quality acquired by the detectors. When a foreign object 40 enters the detectable range, the predetermined light spectrum image data is captured by either the first module 151 or the second module 152. When one of the sensing module identifies that the foreign object 40 is in the low region, the apparatus only capture the object's image in the low region and determine the coordinates of the object by triangulation under two dimensional mode, otherwise, the coordinates of the object are determined by the detectors under three dimensional mode.

Figure 11:
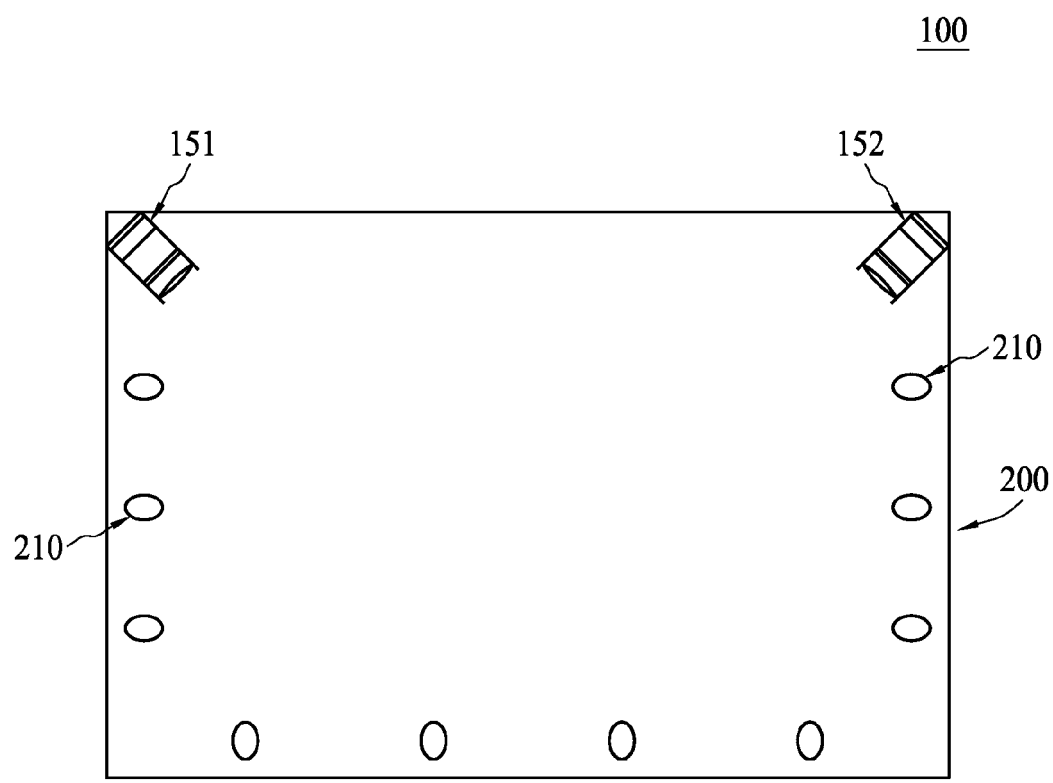
FIG. 11 is a simplified pictorial illustration of a multi-dimensional image detection apparatus with a plurality of light emitting sources in accordance with an embodiment of the present invention.

FIG. 11 illustrates an embodiment according to the present disclosure. A multi-dimensional image detection apparatus 100 has two sensing modules 151 and 152 which are substantially similar to the sensing module illustrated in FIG. 9 or FIGS. 4A & 4B. Each sensing module is arranged at a different location and preferably, proximal to a corner of a substrate 200. The apparatus 100 further includes several light sources 210 which are disposed at least on one side of the substrate.

Figure 12:
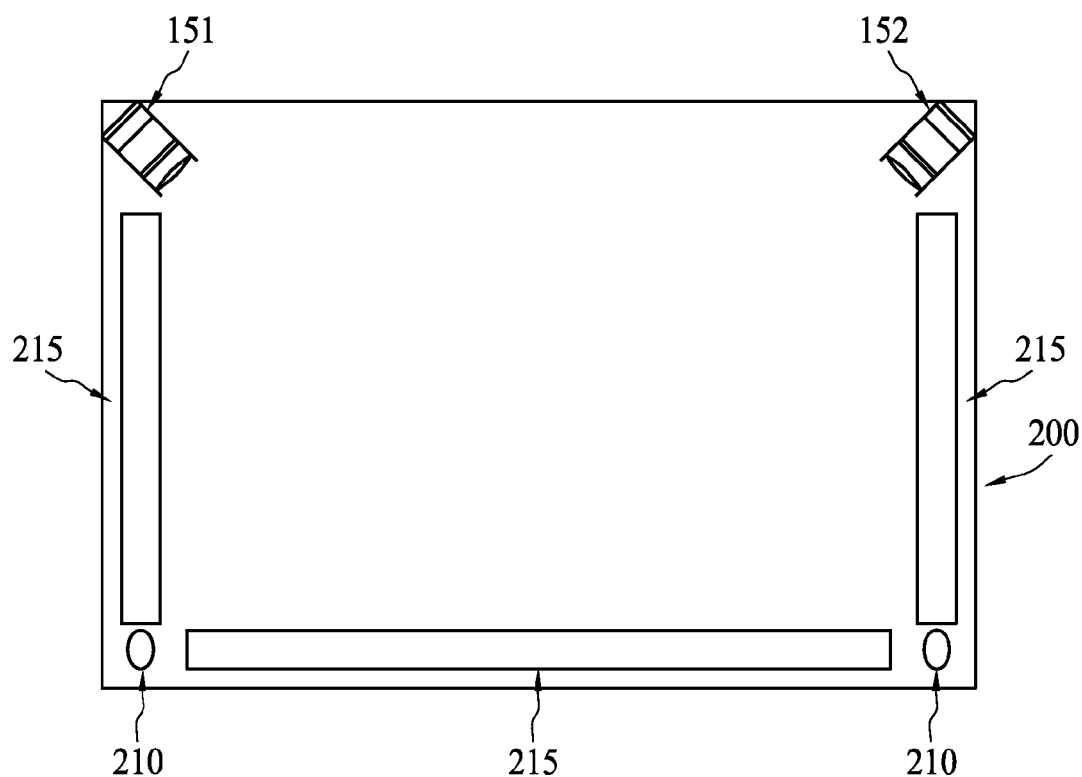
FIG. 12 is a simplified pictorial illustration of a multi-dimensional image detection apparatus in accordance with an embodiment of the present invention.

FIG. 12 illustrates an embodiment which detects two objects simultaneously according to the present disclosure. A multi-dimensional image detection apparatus 100 has two sensing modules 151 and 152. Each sensing module is constructed in the same way as the embodiment shown in FIG. 11. The apparatus 100 further includes a light source 210 and a light guide 215. The predetermined light spectrum emitted by the light source 210 is distributed to the substrate 200 by the light guide 215.

Figure 13:
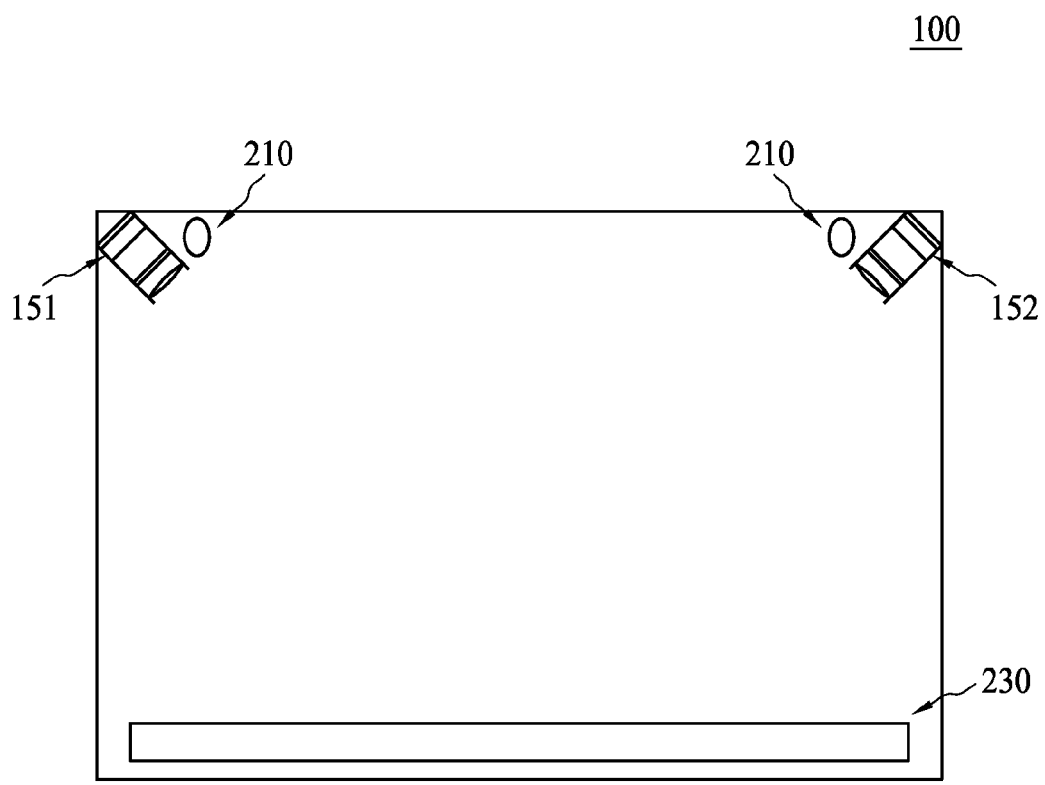
FIG. 13 is a simplified pictorial illustration of a multi-dimensional image detection apparatus with a mirror-retroflector in accordance with an embodiment of the present invention.
Figure 14:
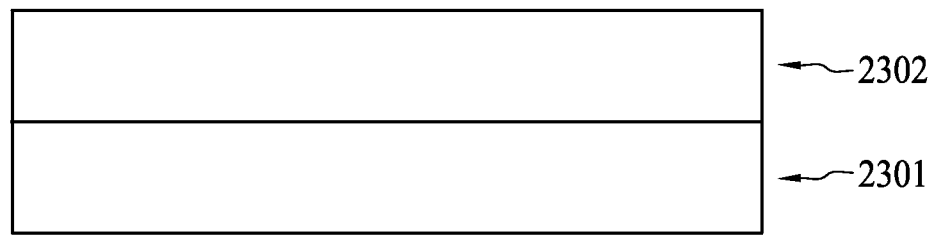
FIG. 14 is a simplified pictorial illustration of a cross-sectional view of the mirror-retroflector illustrated in FIG. 13 in accordance with an embodiment of the present invention.
Figure 15:
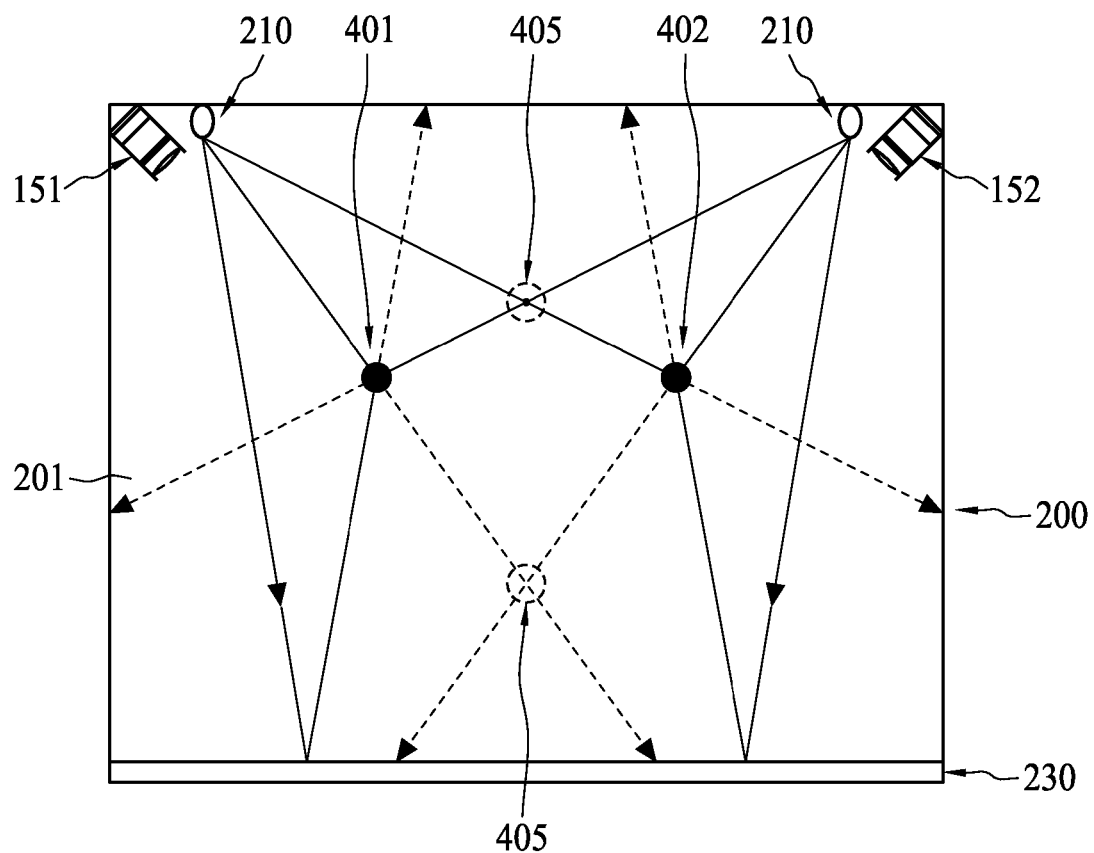
FIG. 15 is a simplified illustration to explain how a multi-dimensional image detection apparatus with a mirror-retroflector eliminates the ghost points

FIG. 13 illustrates an embodiment which is designed to detect two or more objects simultaneously according to the present disclosure. A multi-dimensional image detection apparatus 100 has two image sensing modules 151 and 152. Each module is constructed in the same way as the embodiment shown in FIG. 12. The apparatus 100 further includes a mirror-retroreflector 230 disposed on one side of the substrate which is opposite to the sensing modules. FIG. 14 shows the cross-sectional view of the mirror-retroreflector 230 wherein the mirror-retroreflector 230 is composed of two parts 2301 and 2302. Part 2301 is a retroreflector and part 2302 is a mirror disposed on the retroreflector 2301. In the present embodiment, part 2301 is a retroreflector disposed on substrate 200's contact surface 222; and part 2302 is a mirror disposed on the retroreflector 2301, the positions of part 2301 and 2302 can be interchangable. As illustrated in FIG. 15 (please also refer to FIG. 14), with an additional mirror 2302 on the retroreflector 2301, the image sensing modules 151 and 152 (Inventor: there are no detectors 100 and 1001 in FIG. 15) can selectively read the signal data of pixels of the first object 401 and the second object 402 only from a triple light crossing during the two-dimensional mode. Therefore, the ghost points 405 generated at a double light crossing can be ignored and the false signal of the foreign object can be eliminated. The total thickness of the mirror-retroreflector 230 can be between 2 and 10 mm. In another embodiment, the total thickness is between 5 and 7 mm. The thickness ratio of the mirror to the retroreflector is around 1.0. In another embodiment, the mirror-retroreflector 230 can be composed of a mirror only.

Figure 16:
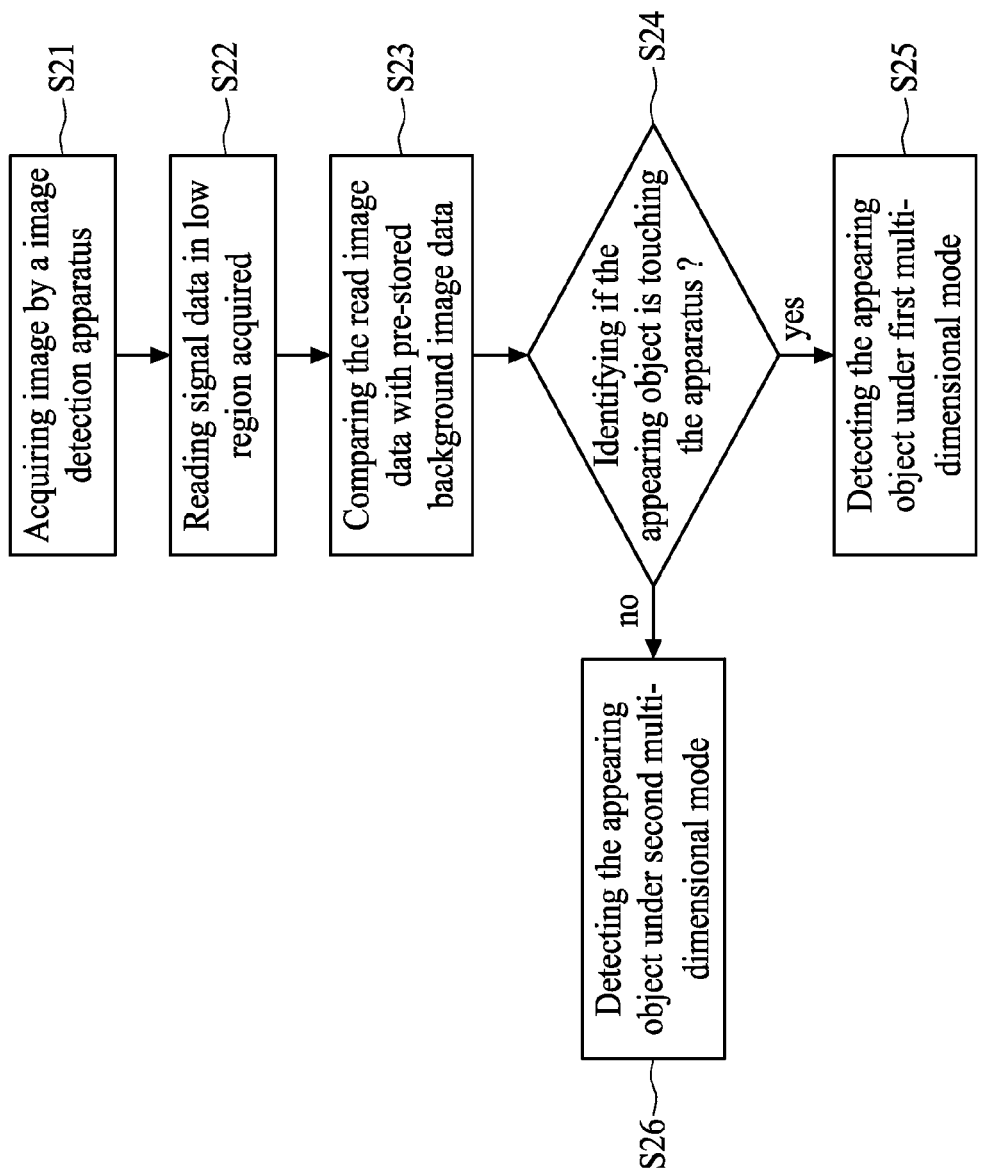
FIG. 16 is a block diagram illustrating a method of multi dimensional image detection in accordance with an embodiment of the present invention.

FIG. 16 depicts a diagram illustrating a method of multifold-mode motion detection according to the present disclosure. A multi-dimensional image detection apparatus 100 is utilized to acquire images at step S21. Image data in the low region acquired by the apparatus 100 is read at step S22. At step S23, the apparatus 100 compares the read image data in S22 with a pre-stored background data which is generated during initialization. If the apparatus 100 identifies that the object is in the low region (in S24) and substantially touching the contact surface, then the apparatus 100 operates under the first multi-dimensional mode (two dimensional mode in this embodiment) and acquire the object 40's image in the low region at S25. At step S26, the apparatus 20 conducts triangulation to locate object 40's two dimensional position. Otherwise, the apparatus 100 acquires object 40's image in the high region at step S27 under three dimensional mode. Further, the three dimension position of the object 40 is identified at step S28 by triangulation.

Figure 17:
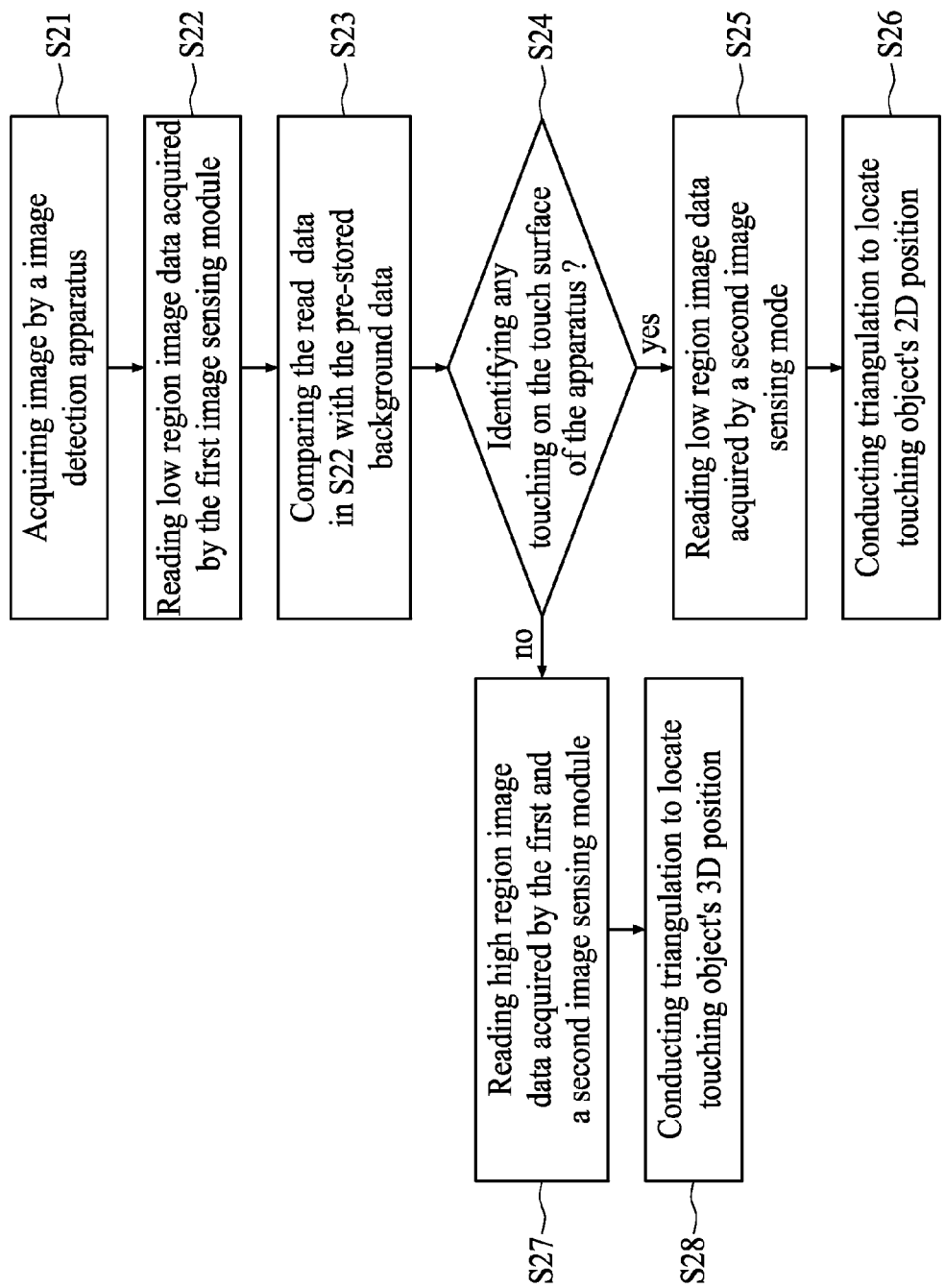
FIG. 17 is a block diagram illustrating a method of multi dimensional image detection in accordance with an embodiment of the present invention.

FIG. 17 depicts a diagram illustrating a method of multifold-mode motion detection according to the present disclosure. A multi-dimensional image detection apparatus 100 is utilized to acquire images at step S21. Image data in the low region acquired by a first image sensing module 151 is read at step S22. At step S23, the apparatus 100 compares the read image data in S22 by the first image sensing module 151 with a pre-stored background data which is generated during initialization. If the apparatus 100 identifies that any object is in the low region (in S24) and substantially touching the contact surface, then the signal data of pixels in low region of a second image sensing module 152 is read at S25. At step S26, the apparatus 20 conducts triangulation to locate touching object 40's two dimensional position. Otherwise, the signal data of pixels of both sensing modules acquire object 40's image in the high region are read at step S27. Further, the three dimension position of the object 40 is identified at step S28 by triangulation.

While the invention has been described above with references to specific embodiments thereof, it can be seen that many changes, modifications and variations in the materials, arrangements of parts and steps can be made without departing from the inventive concept disclosed herein. Accordingly, the spirit and broad scope of the appended claims are intended to embrace all such changes, modifications and variations that may occur to one having skill in the art upon a reading of the disclosure. All patent applications, patents and other publication cited herein are incorporated by reference in their entirety.

What is claimed is:

1. A multi-dimensional image detection apparatus, said apparatus comprising:
    a touch surface on a substrate;
    a first image detection module comprising a first image sensing module and a first light screen;
    a second image detection module comprising a second image sensing module and a second light screen;
    at least one light source for emitting a first predetermined light spectrum being infrared light;
    wherein the first image detection module and the second image detection module located proximally to the touch surface on the substrate for capturing image data based on a received light spectrum,
    wherein each of the first light screen and second light screen having a first region and a second region, and
    wherein a first region of each of the first light screen and the second light screen permits only the first predetermined light spectrum to pass through, and a second region of each of the first light screen and the second light screen permits a second predetermined light spectrum to pass through, the second predetermined light spectrum being visible light; and
    a control module coupled to each of the first image sensing module and second image sensing module, wherein the control module:
    processes at least a portion of the image data captured by at least one of the first image sensing module and the second image sensing module;
    determines a location of a foreign object within a detection region based on the processed image data in comparison; and
    switches, automatically, a mode of operation of the first and second image sensing modules between a first mode of operation and a second mode of operation based on the determined location of the foreign object relative to the touch surface, wherein the location of the foreign object is determined based on the first predetermined light spectrum when operating in the first mode of operation, and wherein the location of the foreign object is determined based on the second predetermined light spectrum when operating in the second mode of operation.

2. The apparatus in claim 1, wherein the control module conducts triangulation to locate the foreign object in at least two dimensions based on the image data.

3. The apparatus in claim 1, wherein the first image detection module further comprises a first light focusing device for refracting the received light spectrum onto a first focal plane for imaging by the first image sensing module, and wherein the second image detection module further comprises a second light focusing device for refracting the received light spectrum onto a second focal plane for imaging by the second image sensing module.

4. The apparatus in claim 3, wherein the first light screen is positioned between the first image sensing module and the first light focusing device, and wherein the second light screen is positioned between the second image sensing module and the second light focusing device.

5. The apparatus in claim 1, wherein each of the first light screen and the second light screen has a first surface and a second surface separated by a thickness, wherein, as the received light spectrum passes through the first region or the second region defined by the first light screen or the second light screen, the received light spectrum passes through the first surface and the second surface of the first or second light screens.

6. The apparatus in claim 1, wherein the at least one light source is disposed on the touch surface.

7. The apparatus in claim 3, wherein an axis of at least one of the first light focusing device and the second light focusing device is tilted relative to an axis of the at least one light source.

8. The apparatus in claim 7, wherein the tilt of the axis of at least one of the first light focusing device and the second light focusing device relative the axis of the light source forms an angle between 40 degrees and 60 degrees.

9. The apparatus in claim 1, wherein at least a portion of the first region defined by the first light screen is in direct contact with a portion of the second region defined by the first light screen, and wherein at least a portion of the first region defined by the second light screen is in direct contact with a portion of the second region defined by the second light screen.

10. The apparatus in claim 6 further comprising a retroreflector disposed on the touch surface, wherein the retroreflector reflects light emitted from the at least one light source towards at least one of the first image sensing module and the second image sensing module.

11. The apparatus in claim 10, wherein a height of the retroreflector is between 2 millimeters (mm) and 10 mm.

12. The apparatus in claim 11, wherein the retroreflector is a mirror-retroreflector or a mirror.

13. The apparatus of claim 1, wherein the first image detection module comprises a first housing,
    wherein the second image detection module comprises a second housing,
    wherein a position of the first light screen within the first housing is fixed relative to a position of the first image sensing module within the first housing, and
    wherein a position of the second light screen within the second housing is fixed relative to a position of the second image sensing module within the second housing.

14. The apparatus in claim 13, wherein the first image detection module comprises a first light focusing device, and wherein the second image detection module comprises a second light focusing device.

15. The apparatus of claim 14, wherein the first light screen is positioned between the first light focusing device and the first image sensing module within the first housing, and wherein the second light screen is positioned between the second light focusing device and the second image sensing module within the second housing.

16. The apparatus of claim 14, wherein the first light focusing device is positioned between the first light screen and the first image sensing module within the first housing, and wherein the second light focusing device is positioned between the second light screen and the second image sensing module within the second housing.

17. A multi-dimensional image detection method, said method comprising:
at an electronic device comprising: a touch surface on a substrate, a first image detection module comprising a first image sensing module and a first light screen, a second image detection module comprising a second image sensing module and a second light screen, and at least one light source for emitting a first predetermined light spectrum being infrared light:
acquiring, by the first image sensing module, first image data based on a first received light spectrum,
wherein the first received light spectrum is passed through the first light screen prior to the first image sensing module acquiring the first image data,
wherein the first light screen defines a first region and a second region,
wherein the first region defined by the first light screen permits only the first predetermined light spectrum to pass through the first region defined by the first light screen, and
wherein the second region permits a second predetermined light spectrum to pass through the second region defined by the first light screen, the second predetermined light spectrum being visible light;
acquiring, by the second image sensing module, second image data based on a second received light spectrum,
wherein the second received light spectrum is passed through the second light screen prior to the second image sensing module acquiring the second image data,
wherein the second light screen defines a first region and a second region,
wherein the first region defined by the second light screen permits only the first predetermined light spectrum to pass through the first region defined by the second light screen, and
wherein the second region defined by the second light screen permits the second predetermined light spectrum to pass through the second region defined by the second light screen;
comparing, by a control module, image data acquired by at least one of the first image sensing module and the second image sensing module to pre-stored background image data;
determining, by the control module, a location of a foreign object based upon the comparing; and
switching automatically, by the control module, a mode of operation of the first image detection module and the second image detection module between a first mode of operation and a second mode of operation based on the location of the foreign object, wherein the location of the foreign object is determined based on the first predetermined light spectrum when operating in the first mode of operation, and wherein the location of the foreign object is determined based on the second predetermined light spectrum when operating in the second mode of operation.

18. The method in claim 17 further comprising: determining the foreign object's two dimensional position using triangulation.

19. The method in claim 17 wherein the first mode of operation is a two-dimensional mode of operation and the second mode of operation is a three-dimensional mode of operation.

20. The method in claim 17 further comprising:
determining, by the control module, the location of the foreign object based on a first portion of the image data when the first and second image sensing modules are operating in the first mode of operation, wherein the first portion of the image data corresponds to pixels of image data captured based on the first predetermined light spectrum; and
determining, by the control module, the location of the foreign object based on a second portion of the image data when the first and second image sensing modules are operating in the second mode of operation, wherein the second portion of the image data corresponds to pixels of image data captured based on the second predetermined light spectrum.

21. The method in claim 20 further comprising determining the foreign object's three dimensional position using triangulation.

22. The method in claim 18 further comprising: continuously recognizing dynamic motion of the foreign object over time; and recognizing a gesture based on the changes in the location of the foreign object.

23. The method in claim 17 further comprising:
acquiring, during an initialization period, image data without any object present in a detection region, and
generating the pre-stored background image data based on the image data acquired during the initialization period.

24. The method in claim 23 further comprising recognizing a touch of the foreign object to the touch surface based on the location of the foreign object.

25. The apparatus in claim 1, wherein the first light screen has a fixed position and orientation relative to the first image sensing module, and wherein the second light screen has a fixed position and orientation relative to the second image sensing module.

* * * * *